Nov. 24, 1964   F. A. M. MOREL ETAL   3,158,742
X-RAY TABLE MOVABLE IN TWO MUTUALLY PERPENDICULAR
DIRECTIONS WITH A RETRACTABLE RADIATION SHIELD
Filed Oct. 20, 1961                              5 Sheets-Sheet 1

INVENTORS
FRANS ALFONS MARIA MOREL
JOHN J. VLACH
BY
ATTORNEYS

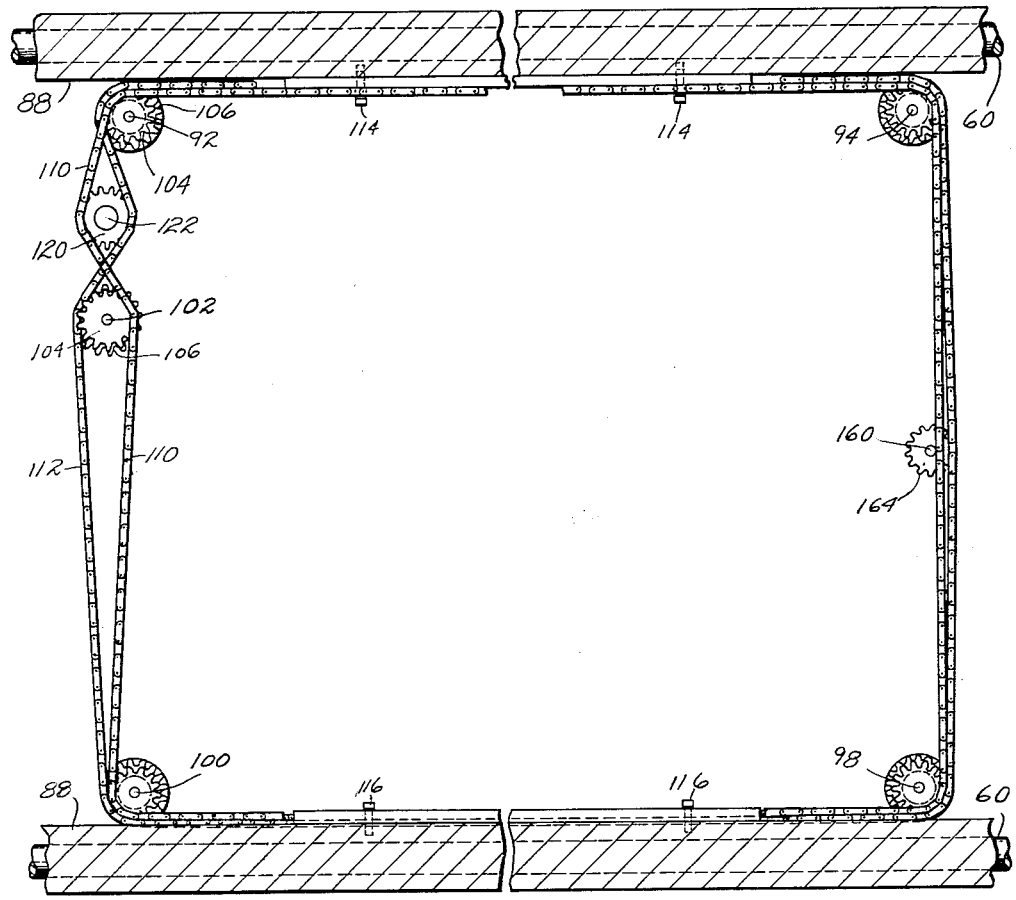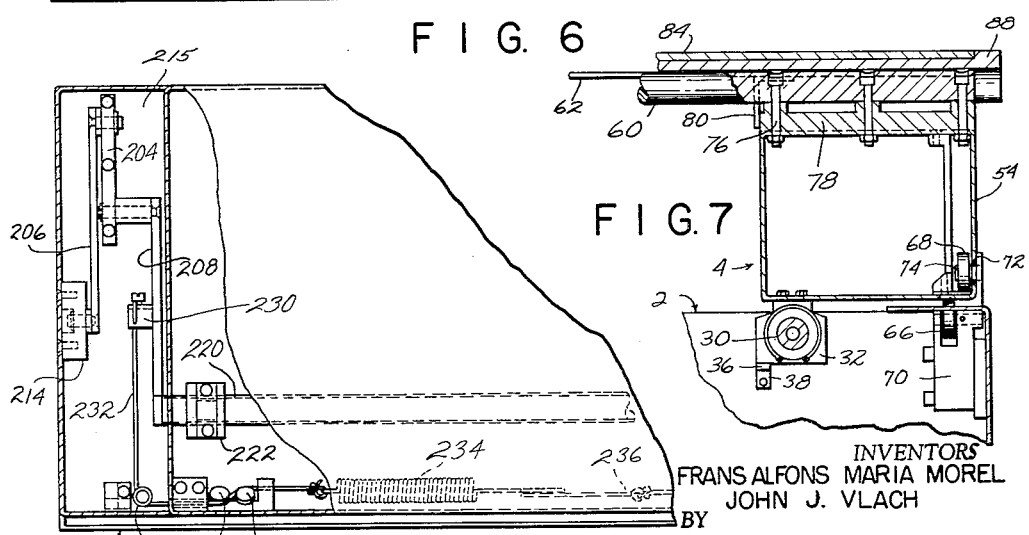

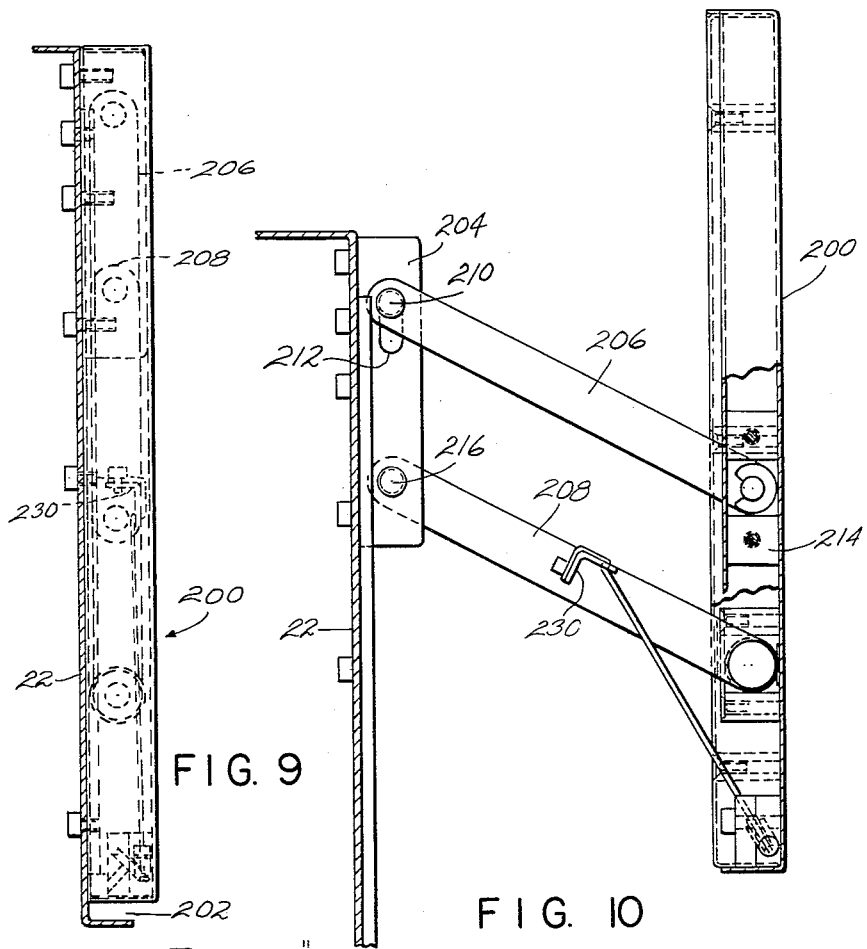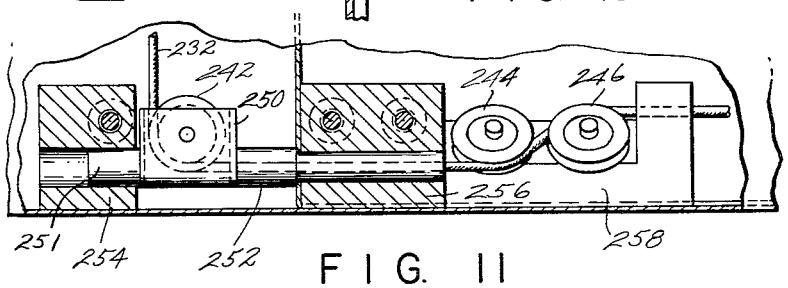

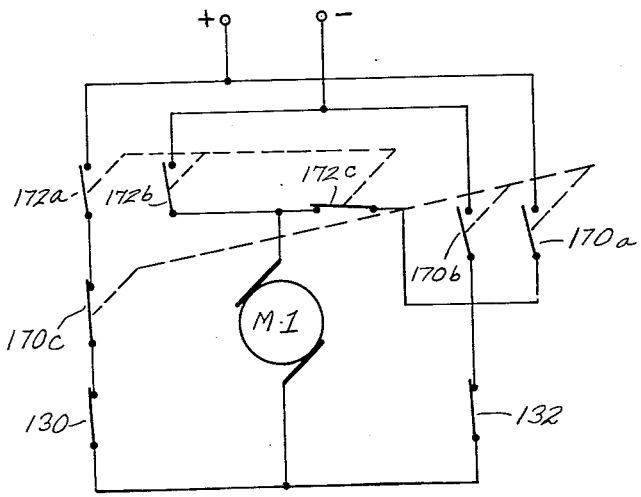
F I G. 12
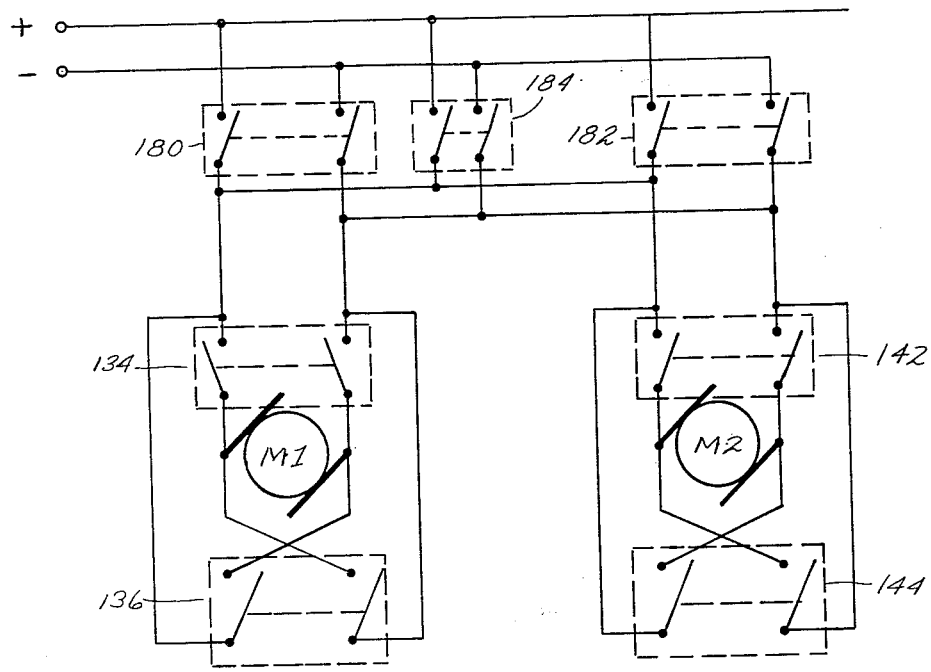
F I G. 13

__United States Patent Office__

3,158,742
Patented Nov. 24, 1964

3,158,742
X-RAY TABLE MOVABLE IN TWO MUTUALLY PERPENDICULAR DIRECTIONS WITH A RETRACTABLE RADIATION SHIELD
Frans Alfons Maria Morel, Antwerp, Belgium, and John J. Vlach, Concord, Mass., assignors, by mesne assignments, to Laboratory for Electronics, Inc., Boston, Mass., a corporation of Delaware
Filed Oct. 20, 1961, Ser. No. 146,498
5 Claims. (Cl. 250—54)

This invention relates to diagnostic X-ray apparatus and more particularly to an X-ray table having a table top which is capable of longitudinal and transverse motion, with means provided whereby the operator can selectively move the table top longitudinally and/or transversely.

The basic requirement of a diagnostic X-ray table is that it be an aid rather than a hindrance to the virtuosity of the radiologist. With this requirement in mind, various attempts have been made to provide X-ray tables which can be adjustably positioned for better radiographs and fluoroscopic images. The present invention relates to further improvements in X-ray tables and has as its chief objective the provision of an X-ray table which can be manipulated by the radiologist with a minimum of effort and with a maximum of freedom in patient positioning and X-ray tube placement.

A more specific object of the present invention is to provide an X-ray table having a top which is located at a comfortable working height for the radiologist and which can be moved readily both longitudinally and transversely by selectively operated motorized means that are mounted and constructed so as to provide greater space within the table for increased depth of focus from the X-ray tube to the patient and maximum X-ray tube travel within the table (or maximum bucky travel within the table).

A further object of the present invention is to provide an X-ray table wherein the table top is capable of movement along two different axes and which further includes a radiation shield which (1) can be retracted so as not to obstruct movement of the table top and (2) can be positioned so as to permit the radiologist to work unencumbered.

A further object of the present invention is to provide an X-ray table wherein the table top is movable in two directions by means that are simple, relatively inexpensive, smooth operating, and have a minimum mass so as to permit use of a relatively thin table top to facilitate X-ray travel to the film. Also permissible with the novel apparatus is the use of heavy side shielding to protect the radiologist.

A further object of the present invention is to provide an X-ray table having a top which can be moved longitudinally and transversely by selectively operated motorized means and which can be centered automatically along either axis or both axes simultaneously.

Other objects and many of the attendant advantages of the present invention will become more readily apparent as reference is had to the following detailed specification when considered together with the accompanying drawings wherein:

FIG. 6 is a fragmentary bottom view (with certain parts omitted for clarity) showing the drive mechanism for moving the table top end to end (i.e., sidewise);

FIG. 7 is a simplified fragmentary vertical sectional view of one end of the table showing how the table top carriage is connected to the table top and the table base.

FIG. 8 is a fragmentary front elevation of the radiation shield, with a portion broken away to show the mechanisms associated therewith;

FIG. 9 is a vertical sectional view showing how the radiation shield nests in a well in the front panel of the table when not in use;

FIG. 10 is a vertical sectional view illustrating how the radiation shield swings into operative position;

FIG. 11 is an enlargement of a portion of FIG. 8; and

FIGS. 12 and 13 are simplified circuit diagrams of electrical controls for moving the table top fore and aft and/or side to side.

Figure 1:
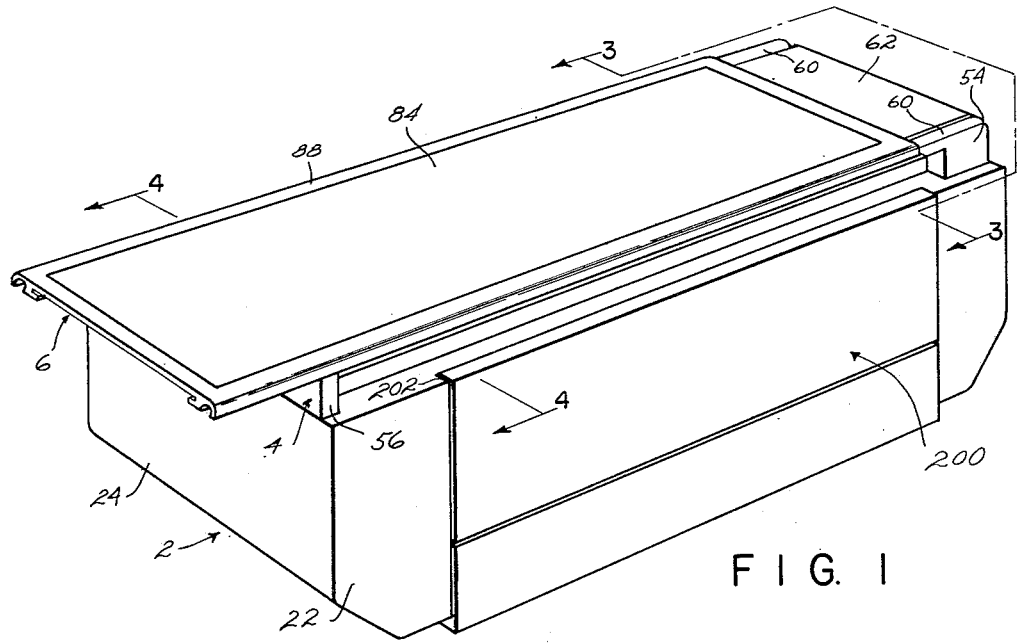
FIG. 1 is a perspective view of an X-ray table embodying the present invention.
Figure 3:
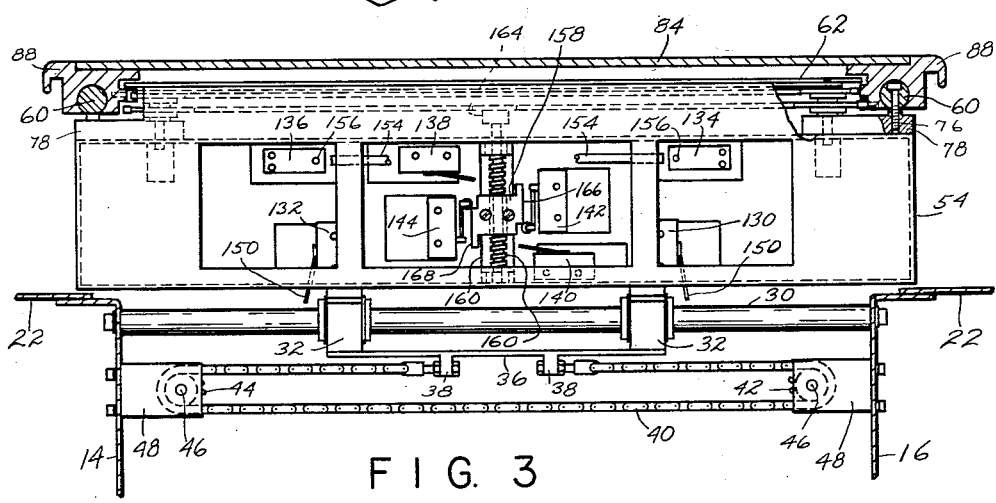
FIG. 3 is a composite sectional and end view taken substantially along line 3—3 of FIG. 1, with certain features omitted for clarity.
Figure 2:
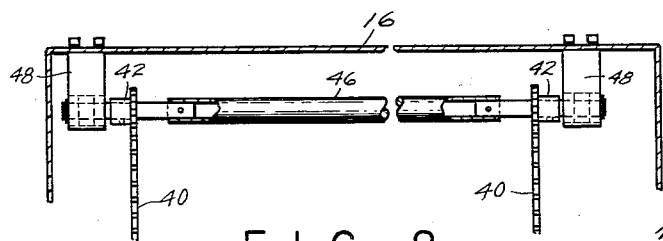
FIG. 2 is a fragmentary plan sectional view of the table base showing a portion of the drive mechanism for shifting the table top carriage fore and aft.

Turning now to FIGS. 1–6, there is shown an X-ray table comprising a base identified generally at 2, a table top carriage identified generally at 4, and a table top identified generally at 6. The base 4 comprises a pair of opposed interior side walls 14 and 16 which are concealed by a pair of opposed side panels 22 and a pair of opposed end panels 24 so as to have a pleasing exterior appearance. It is to be noted that the side panels 22 and the end panels 24 are removable, being held in place by suitable releasable fasteners (not shown).

Extending between and supported by the side walls 14 and 16 adjacent each end of base 2 is a horizontal shaft 30. Each shaft 30 slidably supports a pair of collars 32. Each pair of collars is linked by a rigid metal strap 36. These straps 36 have two depending lugs 38 which are connected on a pair of sprockets 42 and 44. Each chain 40 is mounted on a pair of sprockets 42 and 44. The latter are mounted on identical shafts 46 which are journaled in suitable bearing supports 48 attached to the side walls 14 and 16. One of the shafts 46 is driven by a reversible motor M1 through an appropriate gear reduction unit 50.

The two pairs of collars 32 support the carriage 4. The latter comprises box-like end members 54 and 56 connected by a pair of slide rods 60 and a thin cover plate 62 which conceals certain mechanism for moving the table top 6. The collars 32 are secured to the bottoms of the end members 54 and 56, as seen best in FIG. 7. To facilitate movement of the carriage on shafts 30, each carriage end member is supported by several sets of rollers 66 and 68.

Each set of rollers 66 and 68 is carried by a bracket 70. These brackets are catched to the base 2 at appropriate points. Each roller 66 engages the underside of the bottom of the associated end member 54 or 56. Its companion roller 68 engages the upperside of the same bottom. In order to permit the rollers 68 to be inside the box-like end members 54 and 56 and still allow the latter to move back and forth along shafts 30, elongated horizontal slots 72 are provided in members 54 and 56 for the stub shafts 74 which carry the rollers 68. The rollers 66 and 68 not only faciltiate movement of the carriage back and forth along shafts 30, but they also help prevent flexing of the carriage between its ends. In this connection, it is to be noted that the rollers 66 exert an upward force on the end members 54 and 56 while the rollers 68 exert a downward force on the same end members. These opposing forces prevent the end members from rotating about shafts 30, thereby helping to prevent flexing of slide rods 60.

It is believed to be apparent from the foregoing description that when the motor M1 is operated, the carriage 4 will move fore or aft, depending upon the direction of rotation of the motor. In other words, the carriage 4 will move toward or away from the walls 14 and 16.

The slide rods 60 are attached to the end members 54 and 56 by means of removable bolts 76 which pass through reinforcing plates 78 mounted on top of the end members 54 and 56. The cover plate 62 is releasably attached to the end members 54 and 56 by suitable means, such as L-shaped brackets 80. The cover plate 62 is substantially flush with or slightly higher than the slide rods 60. It also is coextensive with and extends between the slide rods 60.

The slide rods 60 directly support the table top 6. The latter comprises a thin but rigid panel 84 which is attached at its longitudinal edges to identical slide carriages 88. These slide carriages 88 have circular grooves on their bottom sides which are sized to slideably receive the slide rods 60. Once the slide rods 60 are located in the grooves formed in the slide blocks 88, the slide block cannot be lifted off. The only way they can be removed is by sliding them off longitudinally.

Referring now to FIG. 6, attached to the carriage 4 by suitable means (omitted for purposes of clarity) is a plurality of vertically extending rotatable shafts 92, 94, 98, 100, and 102. Shafts 92, 94, 98, 100, and 102 each carry two sprockets 104 and 106. The sprockets 104 are slightly smaller than the sprockets 106. The sprockets 104 support a chain 110, and the sprockets 106 support a chain 112. The ends of chain 110 are secured to the inner edge of one of the slide blocks 88 by means of fasteners 114. The other chain 112 is secured to the opposite slide carriage 88 by means of similar fasteners 116. Chains 110 and 112 also ride on a dual drive sprocket 120. As seen in FIG. 6, the chains are crossed so that the drive sprocket 120 will cause their ends to move in the same direction. In other words, the two slide carriages 88 will be pulled in the same direction by chains 110 and 112. Hence, table top 6 will move one way or the other when the chains are driven by drive sprocket 120. The direction of movement of the table will depend on the direction of rotation of the drive sprocket.

Figure 5:
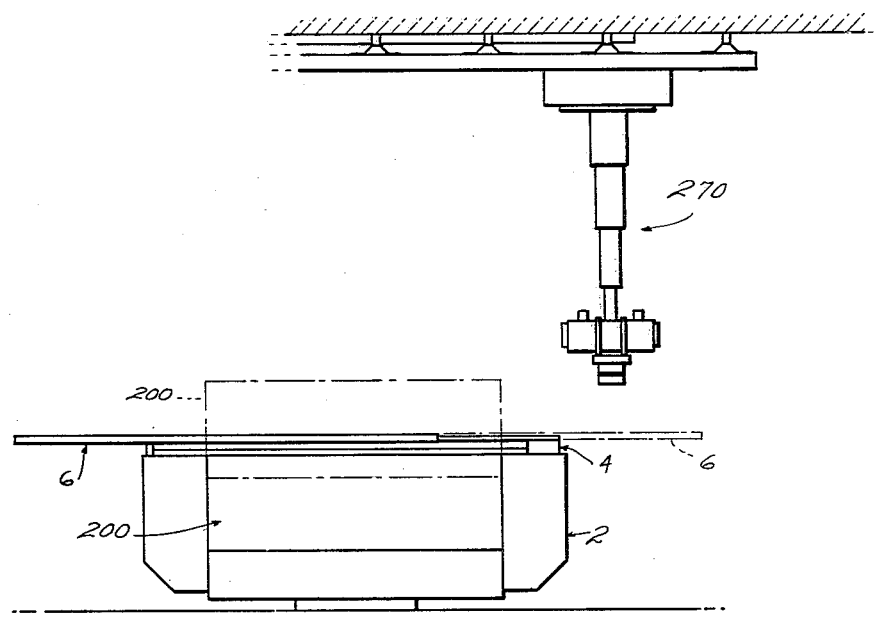
FIG. 5 is a side view in elevation of a conventional overhead tube crane and an X-ray table embodying the present invention.
Figure 4:
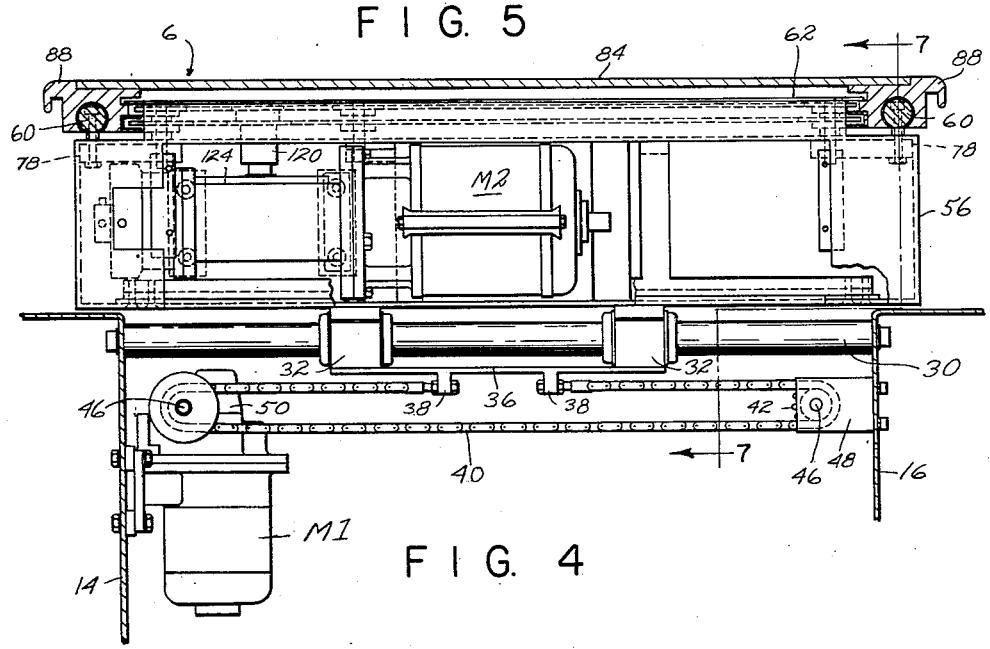
FIG. 4 is a sectional view taken substantially along line 4—4 of FIG. 1, with certain features omitted for clarity.

The dual drive sprocket 120 is mounted on the output shaft 122 of a gear reducer 124 which is driven by a reversible motor M2. The latter are mounted on the end frame member 56 by suitable brackets. Since motor M2 is reversible, it can cause sprocket 120 to drive the table top 6 to the right or left. FIG. 5 shows the table top all the way to the left. Its rightmost position is shown in dashed lines in the same figure.

Before describing the control system in detail, it is to be observed that it is highly desirable that the radiologist be able to shift the table top fore and aft without moving it sidewise, or vice versa, and also be able to move it along both axes simultaneously. It is also desirable that he be able to return it to center position on command. The means for providing control as outlined above include two carriage limit switches 130 and 132, two carriage center position switches 134 and 136, two table top limit switches 138 and 140, and two table top center position switches 142 and 144. Switches 130, 132, 138, 140, 142, and 144 are all carried by brackets attached to the carriage 4. The other two switches 134 and 136 are carried by fixed members (not shown) attached to the table base 2. Switches 130 and 132 are normally closed and have depending flexible actuating leafs 150 which engage the side walls 14 and 16 when the carriage moves fore and aft respectively. Leafs 150 open switches 130 and 132 upon engagement with walls 14 and 16 respectively. Switches 134 and 136 are normally open switches, each having two sets of contacts.

Associated with switches 134 and 136 is an elongated bar 154 which is attached to the carriage 4. Bar 154 extends equal distances fore and aft from the longitudinal center line of the carriage and is so located as to ride over and depress the operating buttons 156 of switches 134 and 136 when the carriage is moved forward or rearward from its center position. However, when the carriage is centrally located, bar 154 will not be touching buttons 156 and switches 134 and 136 will be open. In other words, when the carriage moves from its center position toward wall 14, switch 134 will close and stay closed until the carriage returns to its center position. The same thing happens to switch 136 when the carriage moves from its center position toward wall 16. Switches 138 and 140 are single, normally closed switches. Switches 142 and 144 are normally open, each having two sets of contacts. Switches 138, 140, 142, and 144 are operated by a cam block 158 which is in the form of a nut mounted on an upright screw 160. The latter is rotatably supported in a U-shaped bracket 162 which is attached to the end member 54 of carriage 4. Cam block 158 is so mounted that it cannot rotate yet is free to move up or down on the screw according to the direction in which the screw is rotated. The upper end of the screw carries a sprocket 164 which engages and is driven by one of the chains 110 and 112. Cam block 158 has two opposed, axially extending flat surfaces 166 and 168 which operates switches 138–144. When the table top is centered along slide rods 60, cam block 158 will be positioned as in FIG. 3 with its surfaces 166 and 168 not engaging any of the switches. When the table top moves to one side of center, cam block surface 166 will close switch 142 and thereafter will open switch 140 when the block reaches a predetermined level above the bottom end of the screw. Switch 142 will stay closed until the cam block returns to its original center position. Switches 138 and 144 will be operated by surface 168 in the same order and at the same distances of table top travel as switches 140 and 142 when the cam block is caused to travel upward on screw 162.

FIGS. 12 and 13 are schematic diagrams of the circuits which control operation of motor M1. These figures include the switches already mentioned plus several other switches. FIG. 12 shows the essential elements of a circuit which permits the carriage 4 to be moved forward and backward. The circuit for permitting the operator to move the table top endwise is omitted since it is identical to FIG. 12 except that different switches are involved. In FIG. 12, switches 170a, b, and c are ganged together. Switch 170c is normally closed; the others are normally open. They are operated by the operator, being labeled "Forward." Switches 172a, b, and c are the same as switches 170a, b, and c respectively but are labeled "Reverse." When the switches 170a, b, and c are actuated, the motor will operate in one direction until the forward limit switch 132 is opened. Thereafter the motor will stop and will not proceed further. However, if switches 172a, b, and c are actuated, the motor will start again, but in the opposite direction. With switches 172a, b, and c actuated, motor M1 will move the carriage back to and beyond center position to the point where the rear limit switch 130 is opened. When switch 130 is opened, the motor then will stop. However, if thereafter switches 172a, b, and c are released and switches 170a, b, and c operated again, the motor again will reverse direction. Switches 170c and 172c isolate the "forward" and "reverse" power circuits for motor M1. The limit switches 130 and 132 will automatically reopen when the carriage moves away from the limits determined by these switches. The same is true of the limit switches 138 and 140 in the corresponding circuit for motor M2.

The circuit of FIG. 13 makes it possible to automatically return both the table top carriage 4 and the table top 6 to center position by operation of a single button. This circuit also permits centering of the carriage or the table top individually. In this circuit, motor M1 is connected between switches 134 and 136 and motor M2 is connected between switches 142 and 144. Switches 180, 182, and 184 are manually operated, normally open, dual switches of the push-button type. Switch 180 will effect centering only of the carirage when it is closed. The other switch 182 permits automatic centering only of the table top. The third manually operated switch 184 causes automatic centering of both the carriage and the table top simultaneously. Switches 180, 182, and 184 may be the kind which shut off immediately when released by the operator, in which case they must be held closed until centering is completed. Alternatively, they may be a kind which shuts off after a delay sufficient to complete centering, thereby making it unnecessary for the operator to hold them closed.

In addition to providing automatic centering control as described previously, the table of FIG. 1 also embodies a radiation shield identified generally at 200 which, when not in use, nests in a well 202 formed in the panel 22 on the front side of the table. The function of the radiation shield is as its name implies—to protect the radiologist from scatter radiation.

FIGS. 8-11 illustrate details of the radiation shield and the manner in which it is mounted. Each end of well 202 has a bracket 204 which pivotally supports the ends of two arms 206 and 208 of equal length. Arm 206 is located on one side of the bracket, and the arm 208 is located on the other side of the bracket. The upper arm 206 has its upper end attached to a pivot pin 210 which is slidably captivated in an elongated vertical slot 212 formed in the bracket 204. The other end of arm 206 is pivotally secured to a bracket 214 which is mounted in an end compartment 215 in the radiation shield 200. Each end compartment 215 is open on its rear side so as to accommodate arms 206 and 208. The bottom arm 208 is pivotally secured to bracket 204 by a pivot pin 216. The opposite end of arm 208 is affixed to a shaft 220 (FIG. 8) which is rotatably supported within the radiation shield by means of a plurality of brackets 222. Shaft 220 extends along the length of the radiation shield, being connected to the other arm 208 located at the opposite end of shield 200. In other words, the shield is supported at each end by a parallel linkage consisting of arms 206 and 208, with arms 206 connected between brackets 204 and 214 and arms 208 connected between brackets 204 and shaft 220. Each arm 208 has a lateral L-shaped extension 230 near its midpoint which functions as an anchor point for one end of a flexible cord 232. The other end of the cord 232 is coupled to a spring 234. The other ends of the two springs 234 are connected to opposite ends of a tie rod 236 which is of a type whose length is adjustable so as to vary the pull exerted on the springs. The springs 234 and the tie rod 236 are in line with each other and lie wholly within the shield. Each cord 232 runs over three pulleys 242, 244, and 246. Pulley 242 is carried by a U-shaped element 250 having tubular extensions 251 and 252. These tubular extensions are journaled in two blocks 254 and 256 attached to the bottom edge of the radiation shield. The cord 232 extends along the inside of the tube 252 and then runs over the pulleys 244 and 246. These other pulleys are supported by pivot pins anchored in a third block 258 which also is attached to the bottom edge of the radiation shield. The pivot pins on which pulleys 244 and 246 are mounted cannot move, unlike the pivot pin of pulley 242 which can tilt since the tubular extensions 251 and 252 which support it are rotatable within blocks 254 and 256. Permitting the axis of pulley 242 to tilt keeps the pulley free to rotate in all positions of the shield. The function of cords 232 and springs 234 is to provide a counterbalancing force which facilitates lifting the shield and holding it in raised position. When the radiation shield is in its at-rest position in well 202, brackets 204 and arms 206 and 208 lie within compartments 215, as seen in FIG. 9. In this position, extensions 230 of arms 208 are in 12 o'clock position relative to the axis of shaft 220, as viewed in FIG. 9, and the springs 234 are under greatest tension. However, since in this position the cords 232 pass through the axis of shaft 220, the pull which they exert on arms 208 is purely radial relative to the pivots of the arms. Hence, they do not exert any turning force on arms 208 and shafts 220. However, when the radiologist starts to lift the shield, a minimum effort is required since as soon as the shield has moved outward sufficiently to bring the extensions 230 away from their normal 12 o'clock position, the pulling force exerted by cords 232 no longer will be radial; hence they will tend to cause arms 208 and shaft 220 to rotate so as to lift the shield to the raised position shown in dotted lines in FIG. 5. The length of cord between each pulley 242 and the associated extension 230 will be shortened as the radiation shield moves up. When the shield is fully raised, the tension in the springs 234 will be minimum and the cords will oppose downward movement of the shield. The length of the extensible linkage 236 is set so that the amount of the force required to raise or lower the shield is small.

When the radiation shield is raised fully, it will project above the table, and the arms 206 and 208 will be slightly short of true vertical position. It is to be observed that the bottom edge of the radiation shield may be provided with slots to accommodate the arms 206 and 208, whereby to permit them to shift still closer to true vertical position so as to place the shield nearer to the table. However, with or without the bottom edge slots, when the shield is raised above the table, it still is spaced from the table top by several inches. This spacing allows the table top to be moved forward closer to the radiologist to the extent determined by limit switch 132. However, this spacing is a slight drawback if the table top is not moved forward, and even more of a drawback if the table top is moved rearward from its normal center position. The drawback is that the spacing makes it somewhat difficult for the radiologist to bend over the table for examination purposes, the extent of difficulty varying with the height of the radiologist and the height of the raised shield. However, it has been recognized that if the elevated shield could be shifted to an inclined position so as to extend over the edge of the table top, the radiologist would be able to inspect the patient closely when the table top is moved rearward without unduly exerting himself by stretching and bending from an awkward position. This is made possible in the illustrated arrangement by means of the slots 212 which allow pivot pins 210 to move up and down. The deliberate play between pivot pins 210 and slots 212 permits the table-attached ends of arms 206 to shift down relative to links 208 when the shield is raised. In other words, arms 206 and 208 stay parallel while the shield is being raised, but arms 206 can shift to a non-parallel position when the shield is in its elevated position. As a consequence, in its elevated state the shield can be pressed to an inclined position over the table top when the latter is centered or has been moved rearward. When it is desired to move the table top forward, the shield can be dislodged from its inclined position by a simple tugging motion of the operator.

It is believed to be apparent from the foregoing description that the invention makes it possible to provide an X-ray table which is simple to construct, easy to control, and which is so convenient to use as to make it possible to take full advantage of the technical skill of the radiologist. The effort required by the radiologist to shift the table top fore and aft or sidewise is minimized due to the fact that the table top and its supporting carriage are both motorized. Moreover, the center positioning controls facilitate restoration of the table top to true center position at conclusion of an X-ray operation. The manner in which the table is constructed also makes it possible to have a radiation shield which, when not in use, nests unobtrusively in a side panel of the machine so as not to disturb its external appearance. Also important is the manner of mounting the radiation shield so that it can be moved and positioned with a minimum of effort by the radiologist and also so that it provides good protection without obstructing the technique of the operator. Although not shown, it is to be understood that the table can be used either with an exterior X-ray source as the ceiling tube crane 270 shown in FIG. 5, in which case the table would embody a bucky or a fluoroscope plate, or an extension tunnel, in which case the X-ray tube would be mounted within the table. On this point, it must be emphasized that the means for supporting and moving the table top and its carriage are so arranged as to leave a maximum of space within the table for full X-ray tube or X-ray bucky travel.

Obviously, many modifications and variations of the present invention are possible in the light of the above teachings. It is to be understood, therefore, that the invention is not limited in its application to the details of construction and arrangement of parts specifically described or illustrated, and that within the scope of the appended claims, it may be practiced otherwise than as specifically described and illustrated.

We claim:

1. An X-ray table comprising a base, a table top carriage mounted on said base for movement back and forth along a first axis, and a table top movable on the carriage and movable back and forth along a second axis at right angles to said first axis, wherein said base has a well formed on one side, and further including a radiation shield plus means pivotally attached to said base and said shield for supporting said shield so that it can nest in said well and also be moved upward and outwardly from said well into an elevated position to protect a radiologist standing next to the table, said means arranged to maintain said shield substantially vertical as it is moved into said elevated position.

2. An X-ray table comprising a base, a table top carriage mounted on said base for movement back and forth along a first axis and a table top mounted on the carriage and movable back and forth along a second axis at right angles to said first axis, and further including a radiation shield, a parallel linkage pivotally attached to said shield and also to a side of said base, said shield supported by said linkage and movable thereby in its entirety outwardly and upwardly away from said base, said shield being movable between a first position in a well in said base and a second position wherein it projects above said table top, said parallel linkage being arranged such that in said second position said shield may either remain in a plane normal to said table top or be tilted forward to a position angularly inclined toward said table top, and further including means counterbalancing said shield whereby to facilitate movement and positioning thereof by a radiologist.

3. An X-ray table comprising a base, a table top carriage mounted on said base for movement back and forth along a first axis and a table top mounted on the carriage and movable back and forth along a second axis at right angles to said first axis, and further including a radiation shield, a parallel linkage pivotally attached to said shield and also to a side of said base, said shield supported by said linkage and movable thereby in its entirety outwardly and upwardly away from said base, further including means counterbalancing said shield whereby to facilitate movement and positioning thereof by a radiologist, said table including a well in the side of said base adapted to receive said shield, and further wherein said shield is movable between a first position in said well and a second position wherein it projects above said table top, said shield in said second position being spaced from said table top when said top is centered relative to said base, whereby said top may be moved forward a predetermined amount without striking said shield in said second position, and wherein said shield in said second position may be rotated from a first pivot position in a plane normal to said table top toward a second pivot position in a plane angularly inclined toward said table top.

4. An X-ray table comprising a base, a table top carriage mounted on said base for movement back and forth along a first axis, and a table top mounted on the carriage and movable back and forth along a second axis at right angles to said first axis, and further including a radiation shield movable between a first position in a well in said base and a second position wherein it projects above said table top, a linkage supporting said shield on said base, said linkage including a first pair of links pivotally attached at one end to a fixed pair of points in said shield and pivotally attached at the opposite end to a pair of fixed points in said base and a second pair of links pivotally attached at one end to a second pair of points disposed above said first pair of points in said shield, the opposite ends of said second pair of links being both slidably and pivotally attached to said base.

5. An X-ray table comprising a base, a table top carriage mounted on said base for movement back and forth along a first axis, a table top mounted on said carriage and movable back and forth along a second axis at right angles to said first axis, said carriage comprising a pair of slide rods on which said table top is slideably mounted for movement along said second axis, means for selectively moving said table top back and forth along said slide rods, said means comprising a pair of chains, means connecting the ends of one chain to one side of said table top, means connecting the ends of the other chain to the other side of said table top, sprocket means attached to said carriage and supporting said chains, said sprockets defining circuits of movement for said chains in a plane parallel to said table top, and reversible drive means for moving said chains in said circuits so that simultaneously both chains urge said table top in the same direction along said second axis.

References Cited in the file of this patent

UNITED STATES PATENTS

| 1,967,980 | Talty | July 24, 1934 |
| 2,692,173 | Lowitzsch | Oct. 19, 1954 |
| 2,775,709 | Weigel et al. | Dec. 25, 1956 |
| 3,030,508 | Mort et al. | Apr. 17, 1962 |

FOREIGN PATENTS

| 84,959 | Austria | July 25, 1921 |
| 1,240,117 | France | July 25, 1960 |